United States Patent
Johannesson et al.

(10) Patent No.: US 11,764,665 B2
(45) Date of Patent: Sep. 19, 2023

(54) CONTROL OF A MODULAR MULTILEVEL CONVERTER OF A FULL BRIDGE OR MIXED ARM TYPE IN CASE OF A DC LINE DISTURBANCE

(71) Applicant: Hitachi Energy Switzerland AG, Baden (CH)

(72) Inventors: Niclas Johannesson, Ludvika (SE); Adil Abdalrahman, Västerås (SE); Khirod Kumar-Nayak, Odisha (IN)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 18/015,493

(22) PCT Filed: Jul. 10, 2020

(86) PCT No.: PCT/EP2020/069644
§ 371 (c)(1),
(2) Date: Jan. 10, 2023

(87) PCT Pub. No.: WO2022/008085
PCT Pub. Date: Jan. 13, 2022

(65) Prior Publication Data
US 2023/0198379 A1    Jun. 22, 2023

(51) Int. Cl.
*H02M 1/32* (2007.01)
*H02M 7/483* (2007.01)

(52) U.S. Cl.
CPC ........... *H02M 1/325* (2021.05); *H02M 7/483* (2013.01)

(58) Field of Classification Search
CPC ........ H02M 1/32; H02M 1/325; H02M 7/483; H02M 7/42
See application file for complete search history.

(56) References Cited

U.S. PATENT DOCUMENTS

| | | | |
|---|---|---|---|
| 9,893,633 B1* | 2/2018 | Li | H02M 1/14 |
| 10,326,355 B2* | 6/2019 | Kikuchi | H02M 7/12 |

(Continued)

FOREIGN PATENT DOCUMENTS

WO    2019/219217 A1    11/2019

OTHER PUBLICATIONS

Hu et al., "DC fault ride-through of MMCs for HVDC systems: a review", Journal of Engineering, Jun. 2016, vol. 2016, iss. 9 pp. 321-331, doi: 10.1049/joe.2016.0195.

(Continued)

*Primary Examiner* — Adolf D Berhane
(74) *Attorney, Agent, or Firm* — PROCOPIO CORY HARGREAVES AND SAVITCH LLP

(57) ABSTRACT

A method of controlling a modular multilevel converter, MMC, of a full-bridge or mixed arm type in case of a DC line disturbance is provided. The method includes determining whether a magnitude of a DC voltage (Udp) of the MMC has fallen below an upper voltage threshold (Ud_max_lim), and, if determining that the magnitude of the DC voltage has fallen below the upper voltage threshold, reducing both a magnitude of an AC active current reference (IVD_ORD) and a magnitude of a DC voltage reference (UDC_REF) for the MMC based on the DC pole voltage. An MMC with a controller implementing the method, a converter station including at least one such MMC, and a power transfer system including at least one such converter station, are also provided.

20 Claims, 2 Drawing Sheets

(56) References Cited

U.S. PATENT DOCUMENTS 10,734,804 B2 * 8/2020 Aramaki .................. H02J 1/00
2020/0177098 A1 6/2020 Buchmann et al.

OTHER PUBLICATIONS

International Preliminary Report on Patentability for the corresponding PCT Application No. PCT/EP2020/069644 dated Sep. 22, 2022, 13 pages.
International Search Report and Written Opinion of the International Searching Authority, for the corresponding PCT Application No. PCT/EP2020/069644 dated Mar. 12, 2021, 14 pages.

* cited by examiner

CONTROL OF A MODULAR MULTILEVEL CONVERTER OF A FULL BRIDGE OR MIXED ARM TYPE IN CASE OF A DC LINE DISTURBANCE

CROSS-REFERENCE TO RELATED APPLICATIONS

The present application is a national stage entry of International Patent Application No. PCT/EP2020/069644, filed on Jul. 10, 2020, which is hereby incorporated herein by reference as if set forth in full.

TECHNICAL FIELD

The present disclosure relates to the field of modular multilevel converters of a full-bridge or mixed arm type. More in particular, the present disclosure relates to control of such converters in case of a DC line disturbance such as e.g. a DC fault.

BACKGROUND

Modular multilevel converters (MMCs) with phase arms including converter cells of a full-bridge (FB) type may, unlike those e.g. including only converter cells of a half-bridge (HB) type, help to block a surge current flow between an AC side and a DC side of the converter in case of a disturbance on a DC line to which the MMC is connected, such as for example a DC fault. Due to its DC fault ride-through capabilities, such an MMC may isolate the DC fault while still supporting the AC grid with reactive power. However, for these actions to function adequately, appropriate control of the MMC is needed once the DC fault occurs, including reducing the DC voltage generated by the converter as soon as possible.

To provide a robust and reliable converter, the DC fault thus needs to be detected as quickly as possible. A too fast detection of the DC fault may however increase the sensitivity of the fault detection beyond a desired level. This may increase the risk of false triggering and a tripping of the MMC without any contingency and reduce the robustness of the fault detection.

SUMMARY

The present disclosure seeks to at least partly remedy the above discussed issues. To achieve this, a method of controlling an MMC in case of a DC fault, an MMC, a converter station, and a power transfer system, as defined by the independent claims are provided. Further embodiments are provided in the dependent claims.

According to a first aspect of the present disclosure, there is provided a method of controlling a modular multilevel converter (MMC) of a full-bridge or mixed arm type in case of a DC line disturbance. The method includes determining whether a magnitude of a DC voltage of (e.g. across) the MMC has fallen below an upper voltage threshold. The method further includes reducing, if determining that the magnitude of the DC voltage has fallen below the upper voltage threshold, both a magnitude of an AC active current reference and a magnitude of a DC voltage reference for the MMC based on the DC voltage. The DC voltage may for example be a measured DC voltage. The DC voltage may for example be a voltage across the MMC, and/or e.g. a DC pole voltage, or similar.

Herein, a "DC line disturbance" may include a disturbance of the DC line current and/or voltage, caused by for example an AC fault, a DC fault, or by other types of faults or disturbances. In what follows, a DC fault will be used as an example of a DC line disturbance, but it should be noted that a DC line disturbance may also or alternatively include such other types of faults, and that the method as disclosed herein and the benefits thereof are not restricted only to DC faults In what follows, e.g. in the detailed description of the embodiments illustrated in the drawings, it will also be assumed that the DC voltage is a DC pole voltage, and that this DC pole voltage normally, during steady-state operation, is a positive voltage (measured with respect to e.g. a ground potential). For example, the DC voltage may be a DC voltage of a positive DC pole. It is however also envisaged that the DC voltage may normally be a negative voltage, such as for example a DC voltage of a negative DC pole, if the MMC is connected to such a negative DC pole. As recited earlier herein, the method of the present disclosure uses the magnitude of the DC voltage, and reduces the magnitudes of the AC active current reference and the DC voltage reference. This allows the method to handle both situations (i.e. independent of whether the DC voltage is usually either positive or negative, as measured with respect to e.g. a common ground potential).

Traditional methods and controls for handling e.g. a DC fault in an MMC may depend on a DC fault detection algorithm in order to initiate necessary control actions for handling the DC fault. Such DC fault detection algorithms may rely e.g. on a measured DC current and, as described earlier herein, be required to detect the DC fault so quickly that the detection becomes too sensitive (thus risking e.g. tripping of the MMC without any contingency).

In the case of a DC fault, the DC pole voltage may be suddenly reduced due to e.g. a short between the DC poles and/or e.g. between one of the DC poles and ground. As will be described herein in more detail, the method of the present disclosure may detect that the DC pole voltage has fallen below the upper voltage threshold and a subsequent reduction of the AC active current reference and the DC voltage reference may enable the MMC to operate without tripping (e.g. without shutdown) until the time the DC fault is detected by the traditional DC fault detection algorithm included in the control of the MMC. Phrased differently, the method of the present disclosure may enable to handle the DC fault for a sufficient duration without actually detecting the DC fault. As a result, the speed requirements of the traditional DC fault detection algorithm may be relaxed, and more time may be taken to detect the DC fault. This may reduce the possibility of false triggers and allow for a more robust system operation.

In some embodiments, the method may further include limiting an upper level of a DC current using a DC current controller or a circulating current controller of the MMC. Generally herein, a controller "of" the MMC does not leave out a controller part of e.g. another structure than the MMC itself, but that is still able to send control signals such that e.g. the phase arms of the MMC, and the converter cells therein, can be controlled. As will be described later, limiting the upper level of a DC current (to or at least close to e.g. a nominal value) may be beneficial if the DC fault happens to occur far from the MMC.

In some embodiments, reducing the magnitude of the AC active current reference may include setting the AC active current reference proportional to the DC voltage.

In some embodiments, the method may further include setting the magnitude of the AC active current reference to an upper constant value if the magnitude of the DC voltage is above the upper voltage threshold.

In some embodiments, the method may further include setting the magnitude of the AC active current reference to a lower constant value if the DC voltage is below a lower voltage threshold.

In some embodiments, reducing the magnitude of the DC voltage reference may include setting the magnitude of the DC voltage reference proportional to the reduced magnitude of the AC active current reference.

In some embodiments, the method may further include forcing the magnitude of the DC voltage reference to not exceed a magnitude of a steady state DC voltage reference for the MMC. Herein, a "steady state" may mean an operating state during a time where e.g. no DC fault/line disturbance is present.

According to a second aspect of the present disclosure, there is provided an MMC of a full-bridge or mixed arm type. The MMC includes a controller. The controller is configured to control the MMC by performing a method as described herein with reference to e.g. the first aspect of the present disclosure.

According to a third aspect of the present disclosure, there is provided a converter station. The converter station includes at least one MMC. The at least one MMC may be an MMC as described herein with reference to e.g. the first aspect or the second aspect of the present disclosure.

According to a fourth aspect of the present disclosure, there is provided a power transfer system. The power transfer system includes at least two converter stations connected via a DC link. At least one of the at least two converter stations may be a converter station as described herein with reference to e.g. the third aspect of the present disclosure.

The present disclosure relates to all possible combinations of features recited in the claims. Objects and features described according to the first aspect may be combinable with, or replaced by, objects and features described according to the second aspect, the third aspect, and/or the fourth aspect, and vice versa.

Further objects and advantages of the various embodiments of the present disclosure will be described below by means of exemplifying embodiments.

BRIEF DESCRIPTION OF THE DRAWINGS

Exemplifying embodiments will be described below with reference to the accompanying drawings, in which.

Figure 1:
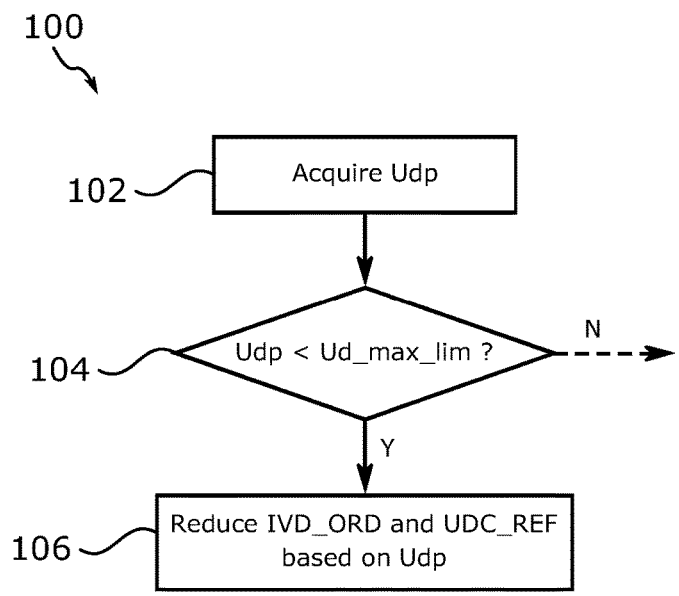
FIG. 1 illustrates schematically a flow of one or more embodiments of a method according to the present disclosure.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the figures, the sizes of elements and regions may be exaggerated for illustrative purposes and, thus, are provided to illustrate the general structures of the embodiments.

DETAILED DESCRIPTION

With reference to FIG. 1, a method according to the present disclosure will now be described in more detail.

FIG. 1 illustrates schematically a flowchart of a method 100 according to one example embodiment of the present disclosure. In a first step 102, a DC pole voltage (Udp) of the MMC is acquired (e.g. measured). In a subsequent step 104, it is determined whether the DC pole voltage (Udp) has fallen below an upper voltage threshold (Ud_max_lim). If, in step 104, it is determined that the DC pole voltage has not fallen below the upper voltage threshold (i.e. that the condition Udp≥Ud_max_lim is fulfilled), the method may for example stop, or for example go back to the step 102 and acquire an updated value of Udp. If, however, it is determined in the step 104 that the DC pole voltage has fallen below the upper voltage threshold (i.e. that the condition Udp<Ud_max_lim is fulfilled), the method may proceed to a step 106 in which both an AC active current reference (IVD_ORD) and a DC voltage reference (UDC_REF) for the MMC are reduced, based on the DC pole voltage Udp. The updated (reduced) values IVD_ORD and UDC_REF may then be provided to and used during subsequent control of the MMC. After the step 106, the method 100 may for example stop, or the method 100 may for example go back to the step 102 and acquire an updated value of Udp.

In case of a DC fault (e.g. a short between a DC pole and ground, and/or e.g. a short between one DC pole and another DC pole), the DC pole voltage Udp may fall. Using a method (such as the method 100 described with reference to FIG. 1) of the present disclosure may help to reduce a DC voltage generated by the MMC (i.e. by reducing the DC voltage reference UDC_REF) when the DC pole voltage Udp falls below a certain upper voltage threshold. This may ensure that the DC current feeding to the fault may be reduced and help to isolate the DC fault as soon as possible. Also, whenever the voltage on the DC side of the MMC (i.e. Udp) falls, the method as disclosed herein may also help to reduce an active power at the AC side of the MMC (i.e. by reducing the AC active current reference/order IVD_ORD). This may help to maintain a power balance in the MMC and also to avoid unwanted cell charging and discharging.

Figures 2A, 2B:
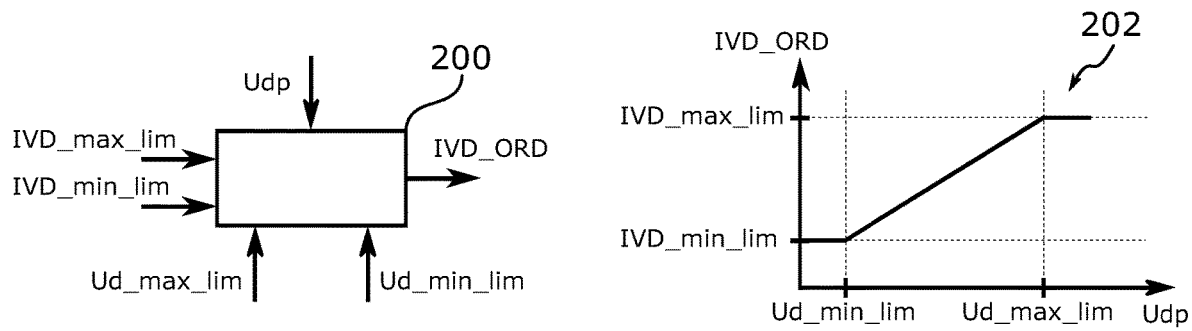
FIG. 2a illustrates schematically a voltage dependent current limiter according to one or more embodiments of the present disclosure.
FIG. 2b illustrates schematically a way of how an AC active current reference may be reduced based on a DC pole voltage according to one or more embodiments of the present disclosure.
Figure 2C:
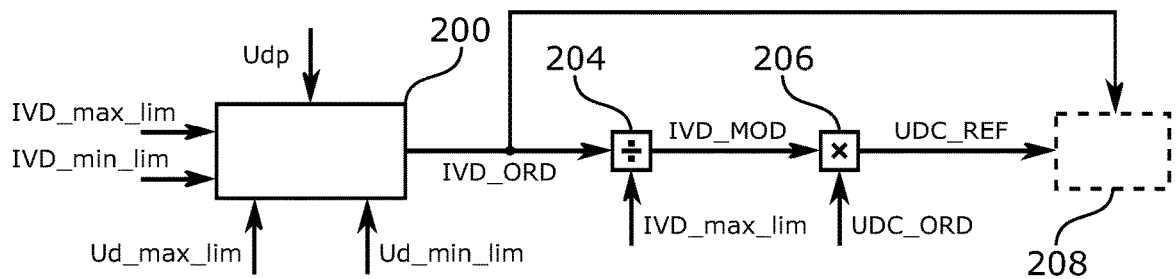
FIG. 2c illustrates schematically a way of how a DC voltage reference may be reduced based on a DC pole voltage according to one or more embodiments of the present disclosure.

With reference to FIGS. 2a, 2b and 2c, various examples of how to reduce the AC active current reference IVD_ORD and the DC voltage reference UDC_REF will now be described in more detail.

FIG. 2a illustrates schematically one example of a voltage dependent current limiter (VDCL) according to the present disclosure. Such a VDCL may for example be used to perform one or more of the steps 102, 104 and 106 of the method 100 described herein with reference to FIG. 1.

The VDCL 200 takes as its input the DC pole voltage Udp, limiting values (IVD_max_lim and IVD_min_lim) for the AC active current reference IVD_ORD (corresponding to the active power), and upper and lower voltage thresholds (Ud_max_lim and Ud_min_lim) for the DC pole voltage Udp. The upper and lower voltage thresholds are used to define a voltage region wherein the AC active current reference IVD_ORD is reduced based on Udp, while the limiting values for the AC active current reference IVD_ORD are used to keep the AC active current reference to within a limited value range. Based on Udp, the VDCL 200 outputs an updated (e.g. reduced) AC active current reference IVD_ORD. It is envisaged that the various values of IVD_max_lim, IVD_min_lim, Ud_max_lim and Ud_min_lim may be selected such that the VDCL 200 does not interfere during for example other, smaller disturbances and/or during steady state operation of the MMC.

FIG. 2b illustrates schematically one example of how the AC active current reference IVD_ORD output from the VDCL 200 described with reference to FIG. 2a may be reduced based on the DC pole voltage Udp.

If Udp is above the upper voltage threshold Ud_max_lim, IVD_ORD is limited to a constant upper limit value IVD_max_lim corresponding to a maximum allowed active current (or e.g. power) reference for the MMC. Likewise, if Udp is below the lower voltage threshold Ud_min_lim, IVD_ORD is limited to a constant lower limit value IVD_min_lim. The value of IVD_min_lim may for example be set to zero, or close to zero.

If Udp is within the region defined in between Ud_min_lim and Ud_max_lim, the AC active current reference IVD_ORD is reduced based on Udp. In the example described with reference to FIG. 2b, IVD_ORD is reduced proportional to Udp, i.e. such that (within the interval in between Ud_min_lim and Ud_max_lim) the value of IVD_ORD is a linearly increasing function of Udp. As an example, in this region, the AC active current reference may be given as IVD_ORD=IVD_min_lim+(IVD_max_lim−IVD_min_lim)*(Udp−Ud_min_lim)/(Ud_max_lim−Ud_min_lim).

Although FIG. 2b illustrates a linear dependence of IVD_ORD on Udp, it is envisaged also that other dependencies may also be used, as long as at least within some region of Udp values the AC active current IVD_ORD is reduced as Udp is reduced, when Udp falls below an upper voltage threshold (such as Ud_max_lim).

FIG. 2c illustrates schematically one example of how the DC voltage reference UDC_REF may be reduced based on Udp according to the present disclosure. As shown in FIG. 2c, the AC active current reference IVD_ORD output from the VDCL 200 is provided to a scaling unit 204, where the value of IVD_ORD is scaled by dividing it with IVD_max_lim such that a modified AC active current reference IVD_MOD is provided as IVD_MOD=IVD_ORD/IVD_max_lim. Phrased differently, after the scaling unit 204, the value of IVD_ORD is bound to the interval [IVD_min_lim/IVD_max_lim, 1]. The modified value IVD_MOD of the AC active current reference is then provided to a multiplication unit 206, where it is multiplied with a value UDC_ORD. The value UDC_ORD corresponds to a DC voltage reference for a steady state operation of the MMC. The output from the multiplication unit 206 is the DC voltage reference UDC_REF. When the value of IVD_ORD is below one (which is the case if Udp goes below the upper voltage threshold, Ud_max_lim), the DC voltage reference UDC_REF thus represent a reduced DC voltage reference compared to the steady state DC voltage reference UDC_ORD. Here, UDC_REF is the reduced DC voltage reference discussed herein e.g. with reference to the method 100 described with reference to FIG. 1.

The DC voltage reference UDC_REF and the AC active current reference IVD_ORD are then provided to other parts 208 of the control of the MMC, where they are used to both lower an AC active current (and thereby an active power on the AC side of the MMC) and a DC side voltage generated by the MMC (such that a current feeding a DC fault may also be reduced).

As discussed earlier herein, it is envisaged also that the DC voltage (e.g. the DC pole voltage) may normally be a negative voltage, such as for example a negative DC pole voltage. If this is the case, it is envisaged that the various embodiments of the method described above with reference to FIGS. 1, 2a, 2b and 2c are modified such that for example the absolute value of Udp is used instead, and such that it is the magnitudes of the AC active current reference and the DC voltage reference that are reduced based on the DC voltage.

As discussed earlier herein, it may be possible that if the location of the DC fault is far from e.g. a converter station in which a method according to the present disclosure is implemented to control one or more MMCs, the DC pole voltage may not fall below the upper voltage threshold (e.g. Ud_max_lim). In such a situation, reducing of e.g. the DC voltage reference may not take place, and the converter station may continue to feed DC current to the fault. As a measure against such unwanted situations, the present disclosure also envisages one or more embodiments of e.g. the method in which a DC current controller or a circulating current controller of the MMC is used to limit an upper level of a DC current. For example, the DC current may be limited to or close to a nominal value if it increases beyond a certain value. This, combined with e.g. a phase arm capacitor energy controller usually found in the MMC, may then force the DC voltage generated by the MMC to reduce to maintain the rated required circulating current. Here, a phase arm capacitor energy controller may for example try to maintain a total phase arm energy or a sum converter cell voltage of the phase arm to the desired value. This may cause the DC pole voltage of the MMC to be reduced below the upper voltage threshold, which may then be detected by the method as described herein, and the steps of reducing the AC active current reference and the DC voltage reference based on the DC pole voltage may be performed.

As also discussed earlier herein, existing methods of handling a DC fault in an MMC and in a converter station may depend on a DC fault detection which initiates control actions for MMCs of full-bridge or mixed-arm type only once the DC fault has been detected. This may be problematic as it may solely depend upon the DC fault detection algorithm used.

The DC fault algorithms which are used for (HVDC) systems based on line-commutated converters (LCCs) are usually very robust. To achieve this robustness, the algorithms are designed to take advantage of the LCCs inherent capability to autonomously maintain the control over the DC fault current until the fault is detected by the protection. However, in the case of voltage source controllers (i.e. MMCs) which controls the voltage, it is not possible to wait for a longer time without any change in control action once the DC fault has occurred. This is because the converter will not be able to reduce the DC voltage to isolate the DC fault as well the converter not being able to maintain a power balance between the AC and DC sides.

Consequently, the detection of the DC fault needs to be fast for better control and robustness of the system. However, if a DC fault is detected too fast, there may be a risk that the detection becomes too sensitive and that the converter station may trip (e.g. shut down) without contingency, due to its sensitive switching elements. Therefore, the method of the present disclosure may offer an improved control that can handle DC faults autonomously as it will allow for relaxed speed requirements of the DC fault detection algorithm.

It is envisaged herein that an MMC may include additional means suitable for detection and subsequent handling of a DC fault (based for example on a measured DC current).

Figure 3A:
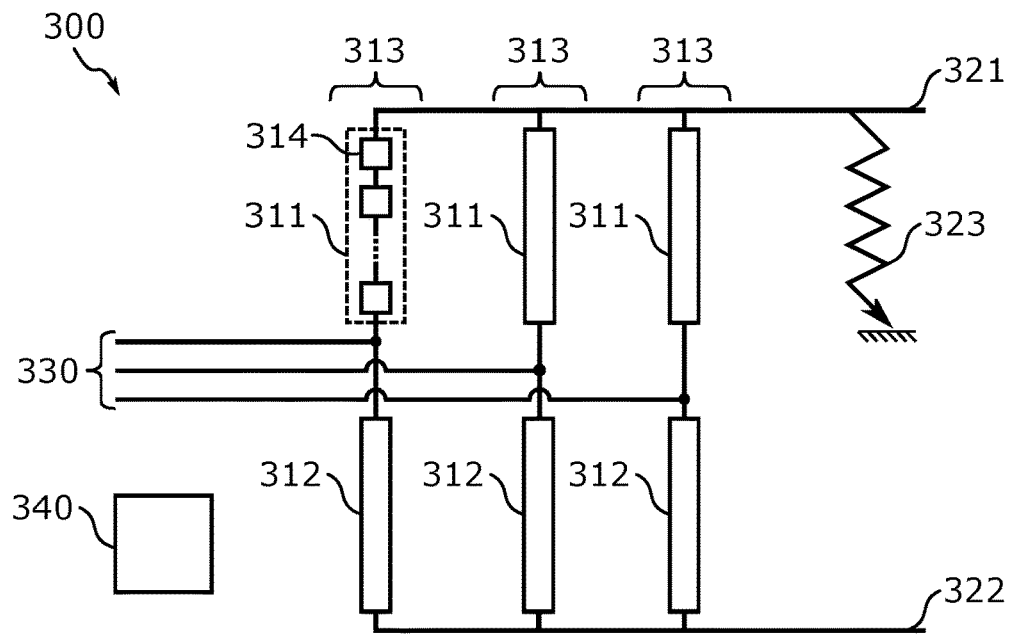
FIG. 3a illustrates schematically an MMC according to one or more embodiments of the present disclosure.
Figure 3B:
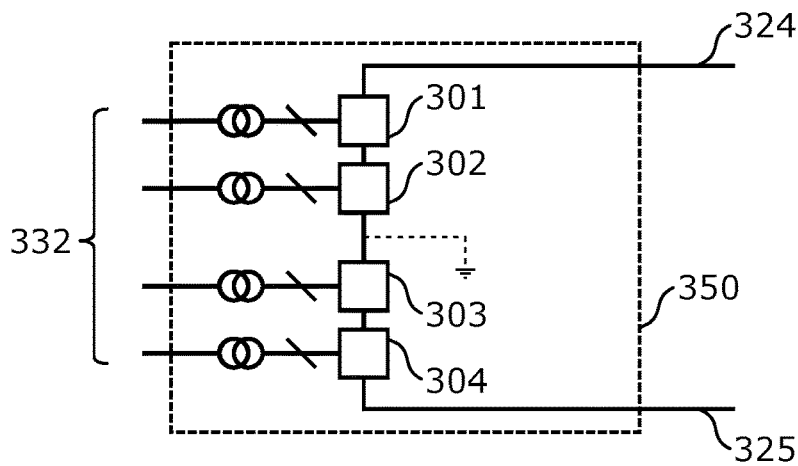
FIG. 3b illustrates schematically a converter station according to one or more embodiments of the present disclosure.
Figure 3C:
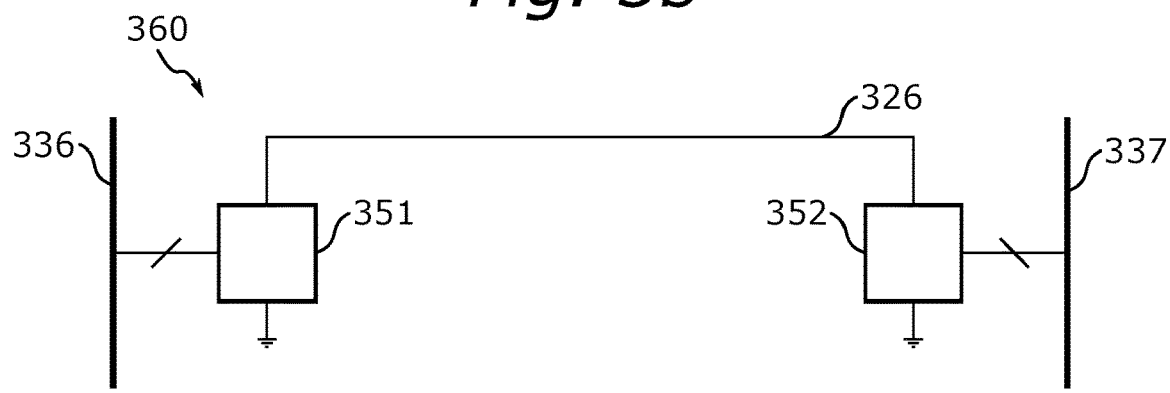
FIG. 3c illustrates schematically a power transfer system according to one or more embodiments of the present disclosure.

With reference to FIGS. 3a, 3b and 3c, various embodiments of an MMC, a converter station, and a power transfer system according to the present disclosure will now be described in more detail.

FIG. 3a illustrates schematically an MMC 300. On a DC side, the MMC 300 is connected to a first DC terminal 321 and a second DC terminal 322. One or both of the DC terminals 321 and 322 may for example correspond to a respective DC pole. As described herein, it is envisaged that a DC fault 323 may occur for the MMC 300, such that there is for example a short created between e.g. the DC terminal 321 and a ground, or similar.

On an AC side, the MMC 300 is connected to one or more AC phases 330. For each AC phase 330, the MMC 300 has a respective phase leg 313. Each phase leg 313 includes an upper phase arm 311 and a lower phase 312. The upper phase arm 311 is connected between the first DC terminal 321 and its respective AC phase 330, while the lower phase arm 312 is connected between its respective AC phase 330 and the second DC terminal 322. A phase arm 311 includes a number of converter cells 314 connected in series. In the present disclosure, it is envisaged that a phase arm 311 includes converter cells 314 of either a full-bridge or a mixed type. For example, it is envisaged that, in a mixed type, the converter cells 314 in a phase arm 311 may be a mix of both full-bridge and half-bridge converter cells. It is envisaged also that other combinations of converter cell types may be used, as long as there are at least some converter cells 314 of a full-bridge type, such that the MMC 300 may handle a DC fault current caused by the DC fault 323 by using the converter cells 314 (of the full-bridge type) to block the DC fault current.

The MMC includes a controller 340 configured to operate e.g. the phase arms 311 and converter cells 314 according to the method according to the present disclosure. The controller 340 may contain the necessary hardware and/or software to e.g. create the required references, including the AC active current reference and the DC voltage reference, and also to reduce their values based on a DC pole voltage as described herein. It is envisaged that the controller 340 may also be configured with other software and/or hardware needed to control the phase arms 311 and the converter cells 314 therein. Here, "to control" may for example include deciding which of the converter cells 314 in each phase arm 311 that, at a certain moment in time, are to be inserted or bypassed from a current path flowing between the respective DC terminal and AC phase between which the phase arm is connected. Of course, it is envisaged also that "to control" may include one or many other functions not discussed nor described herein. During e.g. normal operation (e.g. during steady state operation), the controller 340 may control the phase arms 311 such that the MMC 330 may operate either as an inverter or rectifier, in order to transfer power between the AC side and the DC side as desired.

FIG. 3b illustrates schematically a converter station 350. The converter station 350 has DC terminals 324 and 325 on a DC side, and is connectable to at least one AC grid 332 on an AC side. The converter station 350 includes four MMCs 301, 302, 303, 304. At least one such MMC may be an MMC as described herein, e.g. the MMC 300 described with reference to FIG. 3a.

FIG. 3c illustrates schematically a power transfer system 360. The power transfer system 360 may for example be a HVDC power transfer system. The power transfer system 360 includes at least two converter stations 351 and 352, which are connected via a DC link 326. On their respective AC sides, the converter stations 351 and 352 are connected to a respective AC grid 336 and 337. In FIG. 3c, the power transfer system 360 is illustrated as being in a monopolar configuration (using only a single DC link and a ground return path). It is envisaged that a power transfer system as defined herein may also be in other configurations, such as for example in a bipolar configuration.

In summary, the present disclosure provides an improved way of handling a DC fault for an MMC which includes phase arms of a full-bridge or mixed type. This is achieved by monitoring a magnitude of a DC voltage for the MMC in order to detect if the magnitude of the DC voltage falls below a predefined (upper) voltage threshold. If this is the case, the magnitude of the DC voltage is used to reduce both a magnitude of an AC active current reference and a magnitude of a DC voltage reference for the MMC. This enables to autonomously handle the DC fault (or rather, the DC line disturbance) for sufficient duration before the DC fault is detected and handled by traditional means of the MMC. This in turn allows for relaxed speed requirements for the traditional DC fault detecting algorithm, leading to a reduced risk of over-sensitivity and tripping of the MMC.

Additionally, the present disclosure also provides an improved control of the MMC in order to avoid overcurrent and/or high cell voltage in case there is a severe DC voltage and/or DC current disturbance on a DC line to which the MMC is connected (either directly, or indirectly). Such disturbances may e.g. be from a DC fault, but may also be from other faults/disturbances. Phrased differently, the present disclosure also provides a way of operating the MMC without being subjected to abnormal high current stress or abnormal cell voltage stress even if the DC voltage (e.g. the DC pole voltage) and/or DC line current is abnormal.

Additionally, the present disclosure also provides a way of avoiding undesirable circumstances like when the DC fault occurs far from the MMC. In such a situation, the present disclosure provides embodiments in which a DC current is limited automatically using a DC current controller (or a circulating current controller) in combination with sum cell voltage control. All in all, the present disclosure provides a solution to DC fault handling which may be more robust and reliable, and less sensitive to other transients and dynamics compared with traditional DC fault handling relying solely e.g. on DC current measurements and actual detection of the DC fault before protective actions may be taken.

Although features and elements may be described above in particular combinations, each feature or element may be used alone without the other features and elements or in various combinations with or without other features and elements.

Additionally, variations to the disclosed embodiments may be understood and effected by the skilled person in practicing the claimed invention, from a study of the drawings, the disclosure, and the appended claims. In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method of controlling a modular multilevel converter (MMC) of a full-bridge or mixed arm type in case of a DC fault, the method including:
determining whether a magnitude of a DC pole voltage (Udp) of the MMC has fallen below an upper voltage threshold (Ud_max_lim), and
if determining that the DC pole voltage has fallen below the upper voltage threshold:
reducing both a magnitude of an AC active current reference (IVD_ORD) and a magnitude of a DC voltage reference (UDC_REF) for the MMC based on the DC pole voltage,
wherein reducing the magnitude of the AC active current reference includes setting the magnitude of the AC active current reference proportional to the DC pole voltage, and
wherein reducing the magnitude of the DC voltage reference includes setting the magnitude of the DC voltage reference proportional to the reduced magnitude of the AC active current reference by scaling the magnitude of the AC active current reference by dividing it with a constant upper limit value (IVD_max_lim) thereby providing a modified value of the AC active current reference (IVD_MOD), and multiplying the modified value of the AC active current reference with a steady state DC voltage reference to generate the DC voltage reference with reduced magnitude.

2. The method of claim 1, further including limiting an upper level of a DC current using a DC current controller or a circulating current controller of the MMC.

3. The method of claim 1, further including setting the magnitude of the AC active current reference to a lower constant value (IVD_min_lim) if the magnitude DC pole voltage is below a lower voltage threshold (Ud_min_lim).

4. The method of claim 1, further including forcing the magnitude of the DC voltage reference to not exceed a magnitude of a steady state DC voltage reference (UDC_ORD) for the MMC.

5. A modular multilevel converter (MMC) of a full-bridge or mixed arm type, including a controller configured to control said MMC by performing the method according to claim 1.

6. A converter station, including at least one modular multilevel converter (MMC) according to claim 5.

7. A power transfer system, including at least two converter stations connected via a DC link, wherein at least one of said at least two converter stations is a converter station according to claim 6.

8. The method of claim 1, further including setting the magnitude of the AC active current reference to the constant upper limit value (IVD_max_lim) if the magnitude of the DC pole voltage is above the upper voltage threshold.

9. The method of claim 2, further including setting the magnitude of the AC active current reference to the constant upper limit value (IVD_max_lim) if the magnitude of the DC pole voltage is above the upper voltage threshold.

10. The method of claim 2, further including setting the magnitude of the AC active current reference to a lower constant value (IVD_min_lim) if the magnitude DC pole voltage is below a lower voltage threshold (Ud_min_lim).

11. The method of claim 8, further including setting the magnitude of the AC active current reference to a lower constant value (IVD_min_lim) if the magnitude DC pole voltage is below a lower voltage threshold (Ud_min_lim).

12. The method of claim 9, further including setting the magnitude of the AC active current reference to a lower constant value (IVD_min_lim) if the magnitude DC pole voltage is below a lower voltage threshold (Ud_min_lim).

13. The method of claim 2, further including forcing the magnitude of the DC voltage reference to not exceed a magnitude of a steady state DC voltage reference (UDC_ORD) for the MMC.

14. The method of claim 3, further including forcing the magnitude of the DC voltage reference to not exceed a magnitude of a steady state DC voltage reference (UDC_ORD) for the MMC.

15. The method of claim 8, further including forcing the magnitude of the DC voltage reference to not exceed a magnitude of a steady state DC voltage reference (UDC_ORD) for the MMC.

16. The method of claim 9, further including forcing the magnitude of the DC voltage reference to not exceed a magnitude of a steady state DC voltage reference (UDC_ORD) for the MMC.

17. The method of claim 10, further including forcing the magnitude of the DC voltage reference to not exceed a magnitude of a steady state DC voltage reference (UDC_ORD) for the MMC.

18. The method of claim 11, further including forcing the magnitude of the DC voltage reference to not exceed a magnitude of a steady state DC voltage reference (UDC_ORD) for the MMC.

19. The method of claim 12, further including forcing the magnitude of the DC voltage reference to not exceed a magnitude of a steady state DC voltage reference (UDC_ORD) for the MMC.

20. A modular multilevel converter (MMC) of a full-bridge or mixed arm type, including a controller configured to control said MMC by performing the method according to claim 2.

* * * * *